US012617896B2

(12) United States Patent
Kalgutkar et al.

(10) Patent No.: US 12,617,896 B2
(45) Date of Patent: May 5, 2026

(54) IONOMER POLYAMIDES, PRIMERS, ARTICLES, AND METHODS OF MAKING SAME

(71) Applicant: 3M INNOVATIVE PROPERTIES COMPANY, St. Paul, MN (US)

(72) Inventors: Rajdeep S. Kalgutkar, Woodbury, MN (US); David T. Amos, St. Paul, MN (US); Tianyu Wu, St. Paul, MN (US); Jeffrey A. Peterson, Hugo, MN (US); Becky A. Jetto, Jordan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 236 days.

(21) Appl. No.: 18/706,518

(22) PCT Filed: Oct. 31, 2022

(86) PCT No.: PCT/IB2022/060487

§ 371 (c)(1),
(2) Date: May 1, 2024

(87) PCT Pub. No.: WO2023/105313

PCT Pub. Date: Jun. 15, 2023

(65) Prior Publication Data

US 2025/0223470 A1 Jul. 10, 2025

Related U.S. Application Data

(60) Provisional application No. 63/286,640, filed on Dec. 7, 2021.

(51) Int. Cl.

| | |
|---|---|
| ***C08G 69/26*** | (2006.01) |
| ***C08G 69/34*** | (2006.01) |
| ***C08G 69/40*** | (2006.01) |
| ***C08G 69/42*** | (2006.01) |
| ***C09D 177/08*** | (2006.01) |
| *C09J 177/08* | (2006.01) |

(52) U.S. Cl.

CPC ........... *C08G 69/265* (2013.01); *C08G 69/34* (2013.01); *C08G 69/40* (2013.01); *C08G 69/42* (2013.01); *C09D 177/08* (2013.01); *C09J 177/08* (2013.01); *C09J 2301/302* (2020.08); *C09J 2477/003* (2013.01)

(58) Field of Classification Search

CPC ...... C08G 69/265; C08G 69/34; C08G 69/40; C08G 69/42; C09D 177/08; C09J 177/08; C09J 2301/302; C09J 2477/003

See application file for complete search history.

(56) References Cited

U.S. PATENT DOCUMENTS

| | | | |
|---|---|---|---|
| 3,058,873 | A | 10/1962 | Keim et al. |
| 3,184,436 | A | 5/1965 | Edward et al. |
| 3,389,549 | A | 6/1968 | David |
| 3,454,535 | A | 7/1969 | Bodesheim et al. |
| 3,595,887 | A | 7/1971 | Madhukar et al. |
| 3,709,865 | A | 1/1973 | Lofquist et al. |
| 4,365,041 | A | 12/1982 | Okamoto et al. |
| 5,109,054 | A | 4/1992 | Smith |
| 5,866,675 | A | 2/1999 | Ahmed et al. |
| 6,680,364 | B1 | 1/2004 | Linemann |
| 8,206,538 | B2 | 6/2012 | Feng et al. |
| 8,449,970 | B2 | 5/2013 | Pellerite et al. |
| 8,804,344 | B2 | 8/2014 | Moncrieff |
| 2014/0374032 | A1 | 12/2014 | Heucher et al. |
| 2018/0305544 | A1 | 10/2018 | Perez et al. |
| 2021/0122952 | A1 | 4/2021 | Yao et al. |
| 2021/0253794 | A1* | 8/2021 | Nelliappan ............... D01F 6/80 |

FOREIGN PATENT DOCUMENTS

| | | | | |
|---|---|---|---|---|
| CN | 103232022 | A | | 8/2013 |
| CN | 115746780 | A | * | 3/2023 |
| GB | 1463900 | A | | 2/1977 |
| JP | H-08208830 | A | | 8/1996 |
| WO | 2020079555 | A1 | | 4/2020 |
| WO | 2021048713 | A1 | | 3/2021 |
| WO | 2021074543 | A1 | | 4/2021 |
| WO | 2021137119 | A1 | | 7/2021 |
| WO | 2021137159 | A1 | | 7/2021 |

(Continued)

OTHER PUBLICATIONS

International Search Report for PCT International Application No. PCT/IB2022/060487, mailed on Jan. 20, 2023, 4 pages.
Johnson, "Fatty Acids in Industry: Processes, Properties, Derivatives, Applications", Chapter 7, Marcel Dekker, 1989, pp. 153-175.
Kirk-Othmer, "Organic Chemicals: Dimer Acids", Encyclopedia of Chemical Technology, 2014, (ISBN 9780471238966), John Wiley and Sons, pp. 1-13.
Matsumoto, "Synthesis and Thermal Properties of Poly(Cycloalkyl Methacrylate)s Bearing Bridged- and Fused-Ring Structures", Journal of Polymer Science Part A: Polymer Chemistry, 1993, vol. 31, No. 10, pp. 2531-2539.

(Continued)

*Primary Examiner* — John D Freeman
(74) *Attorney, Agent, or Firm* — Adrian L. Pishko

(57) ABSTRACT

Ionomer polyamides membranes are provided, including a reaction product of a polymerizable composition including a first diacid that is a dimer acid; an ionomer component; a first diamine that is an oxyalkylene diamine; at least one second diamine comprising a primary diamine and/or a secondary diamine; and optionally at least one second diacid. The ionomer component is an ionomer diacid, an ionomer diester, or an ionomer diamine. The present disclosure also provides primers containing the ionomer polyamide dispersed in water and/or a lower alcohol. Further, articles are provided including a substrate and the ionomer polyamide or the primer disposed on the substrate. Methods are additionally provided, including methods of making an ionomer polyamide and making an article.

20 Claims, 2 Drawing Sheets

(56) References Cited

FOREIGN PATENT DOCUMENTS

| | | | |
|---|---|---|---|
| WO | 2021137161 | A1 | 7/2021 |
| WO | 2021209895 | A1 | 10/2021 |

OTHER PUBLICATIONS

Suga, "The Reaction of Cobalt Hydrocarbonyl with Vinylacetate, Crotonate, Styrene, and Acrylates", Bulletin of the Chemical Society of Japan, 1969, vol. 42, pp. 2920-2924.

Werner, "Polyesters, Films", The Encyclopedia of Polymer Science and Engineering—vol. 12—Edition 2, (1987), pp. 193-216.

* cited by examiner

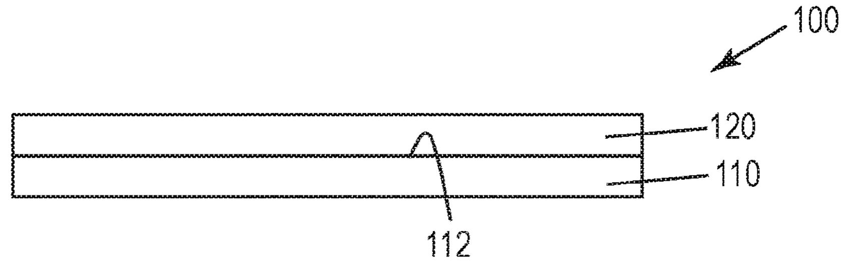

*FIG. 1*

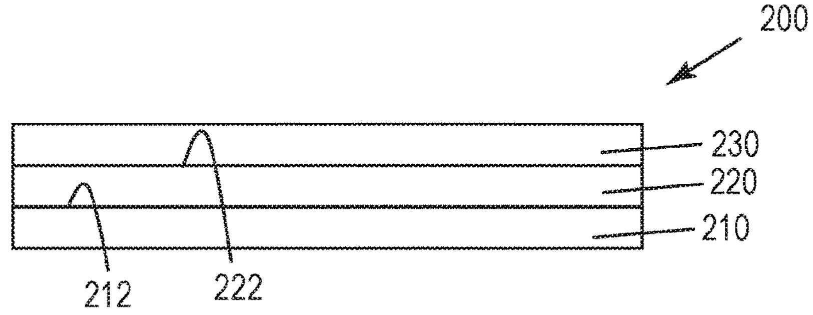

*FIG. 2*

React components of a polymerizable composition comprising:  a) a first diacid that is a dimer acid; b) an ionomer component that is an ionomer diacid, an ionomer diester, and/or an ionomer diamine; c) a first diamine that is an oxyalkylene diamine; d) at least one second diamine comprising a primary diamine and/or a secondary diamine; and e) optionally at least one second diacid; wherein a mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid, and any ionomer diacid or diester used to form the ionomer polyamide; and a mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer polyamide

310

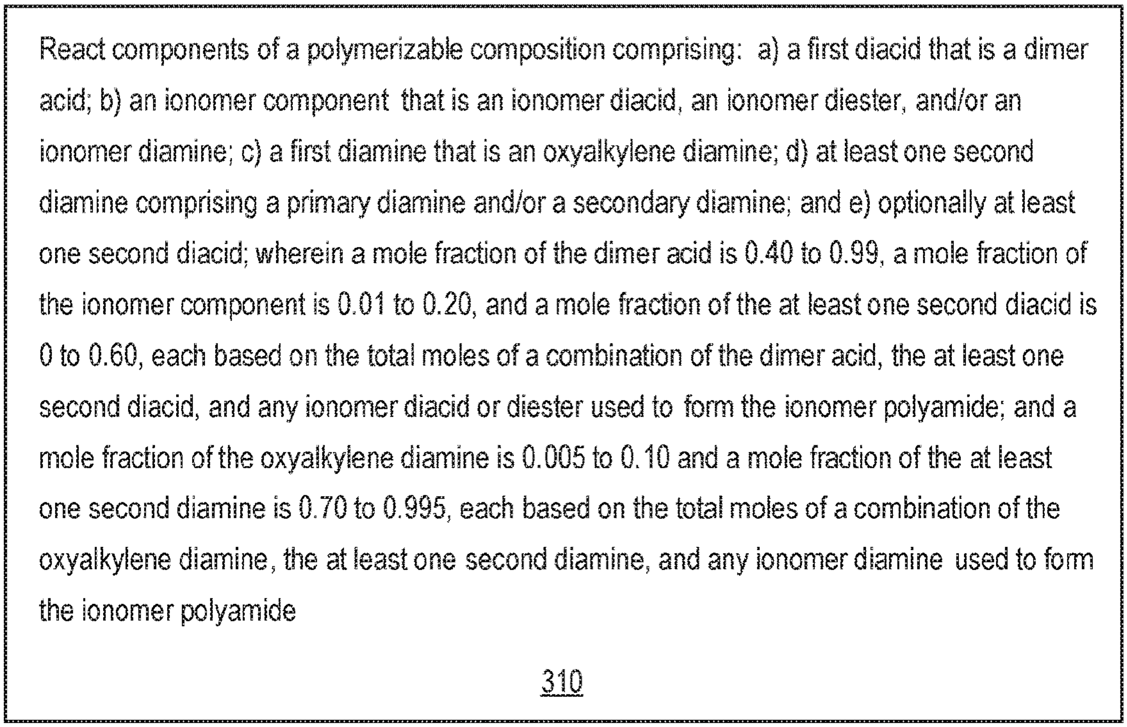

*FIG. 3*

Coat the primer according to the second aspect on a major surface of a substrate

410

Orient the substrate

420

At least one of heat or dry the primer, thereby obtaining a layer of the ionomer polyamide having an average thickness of less than 1 micrometer, less than 0.5 micrometers, or less than 0.25 micrometers

430

Apply a layer of an adhesive on a major surface of the layer of the ionomer polyamide

440

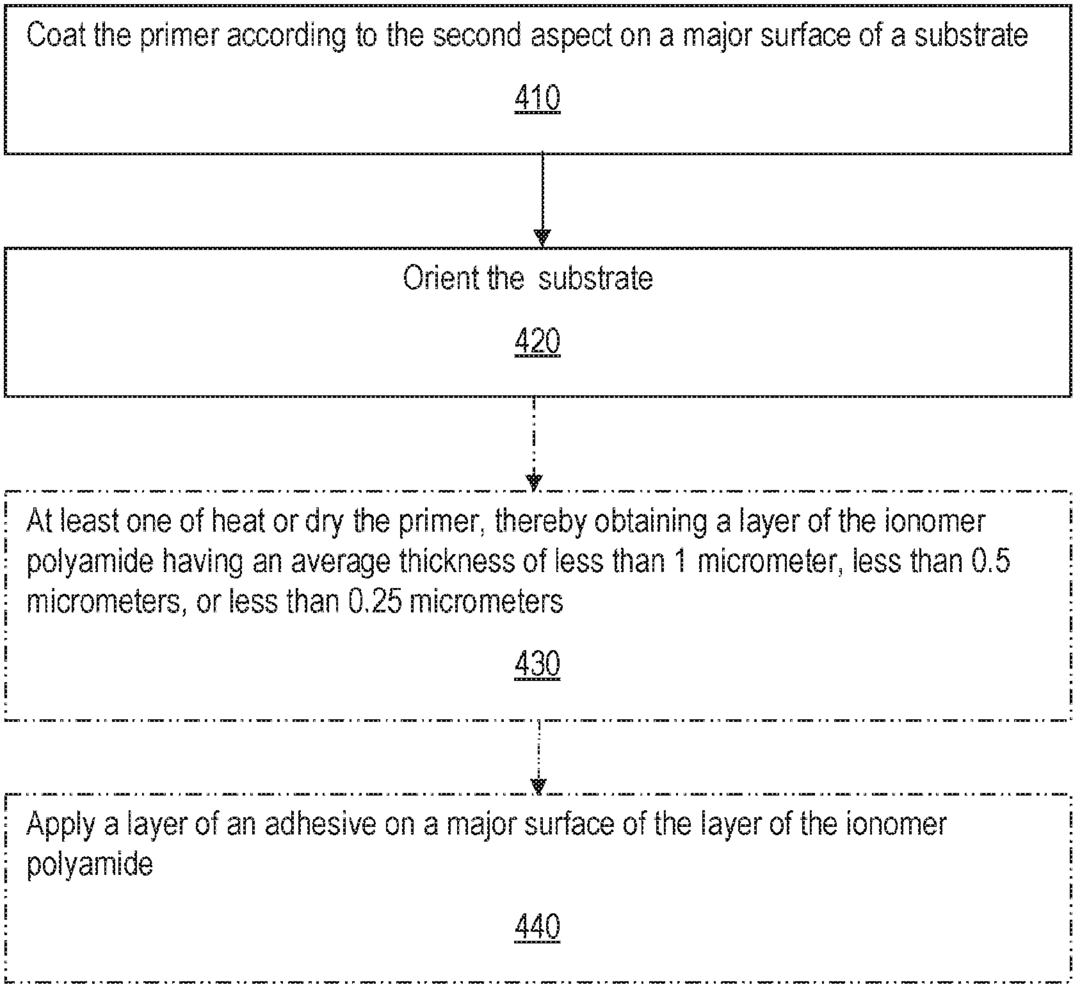

*FIG. 4*

IONOMER POLYAMIDES, PRIMERS, ARTICLES, AND METHODS OF MAKING SAME

FIELD

The present disclosure generally relates to ionomer polyamides.

SUMMARY

In a first aspect, an ionomer polyamide is provided. The ionomer polyamide includes a reaction product of a polymerizable composition including a) first diacid that is a dimer acid; b) an ionomer component that is an ionomer diacid, an ionomer diester, and/or an ionomer diamine; c) a first diamine that is an oxyalkylene diamine; d) at least one second diamine comprising a primary diamine and/or a secondary diamine; and e) optionally at least one second diacid. A mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid, and any ionomer diacid or diester used to form the ionomer polyamide. A mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer polyamide.

In a second aspect, a primer is provided. The primer includes up to 20 percent by weight of the ionomer polyamide according to the first aspect.

In a third aspect, an article is provided. The article includes a substrate and a layer of the ionomer polyamide according to the first aspect disposed on a major surface of the substrate.

In a fourth aspect, another article is provided. The article includes a substrate and a layer of the primer according to the second aspect disposed on a major surface of the substrate.

In a fifth aspect, a method of making an ionomer polyamide is provided. The method includes reacting components of a polymerizable composition including: a) first diacid that is a dimer acid; b) an ionomer component that is an ionomer diacid, an ionomer diester, and/or an ionomer diamine; c) a first diamine that is an oxyalkylene diamine; d) at least one second diamine comprising a primary diamine and/or a secondary diamine; and e) optionally at least one second diacid. A mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid, and any ionomer diacid or diester used to form the ionomer polyamide. A mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer polyamide.

In a sixth aspect, a method of making an article is provided. The method includes: coating the primer according to the second aspect on a major surface of a substrate; and orienting the substrate.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF THE DRAWINGS

FIG. 1 is a schematic cross-sectional view of an exemplary article according to the present disclosure.

FIG. 2 is a schematic cross-sectional view of another exemplary article according to the present disclosure.

FIG. 3 is a flow chart of an exemplary method of making an ionomer polyamide according to the present disclosure.

FIG. 4 is a flow chart of an exemplary method of making an article according to the present disclosure.

While the above-identified figures set forth various embodiments of the disclosure, other embodiments are also contemplated, as noted in the description. In all cases, this disclosure presents the invention by way of representation and not limitation. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Glossary

The thickness of a layer (coating, substrate, adhesive, etc.) should be understood to be its smallest dimension. It is generally referred to as the "z" dimension and refers to the distance between the major surfaces of the layer.

As used herein, the terms "hardenable" refers to a material that can be cured or solidified, e.g., by heating to remove solvent, heating to cause polymerization, chemical crosslinking, radiation-induced polymerization or crosslinking, or the like. As used herein, "polymerizable composition" means a hardenable composition that can undergo addition polymerization upon initiation (e.g., free-radical polymerization initiation) or undergo condensation polymerization when coreacting monomers are combined under appropriate conditions.

The term "backbone" refers to the main continuous chain of a polymer.

The term "aliphatic" refers to C1-C40, suitably C1-C30, straight or branched chain alkenyl, alkyl, or alkynyl which may or may not be interrupted or substituted by one or more heteroatoms such as O, N, or S.

The term "cycloaliphatic" refers to cyclized aliphatic C3-C30, suitably C3-C20, groups and includes those interrupted by one or more heteroatoms such as O, N, or S.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like. As used herein, "Me" refers to a methyl group.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, and 1,4-cyclohexyldimethylene.

Each of "alkenyl" and "ene" refers to a monovalent linear or branched unsaturated aliphatic group with one or more carbon-carbon double bonds, e.g., vinyl.

The term "aromatic" refers to C3-C40, suitably C3-C30, aromatic groups including both carbocyclic aromatic groups as well as heterocyclic aromatic groups containing one or more of the heteroatoms, O, N, or S, and fused ring systems containing one or more of these aromatic groups fused together.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

As used herein, "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl groups, and linked by an aliphatic segment if containing two or more groups. As used herein, "(meth)acrylate-functional compounds" are compounds that include, among other things, a (meth)acrylate moiety.

As used herein, "amorphous polyamide" refers to a polyamide that has an enthalpy of fusion from the second heat ramp of a heat-cool-heat cycle not greater than 50 Joules per gram (J/g) as measured by differential scanning calorimetry (DSC). The enthalpy of fusion of a polyamide is measured by DSC on a differential scanning calorimeter (available under the trade designation Q200 SERIES DSC from TA Instruments, New Castle, DE) using a heat/cool/heat cycle procedure with the following parameters: Equilibrate at (−30.00° C.), then ramp heat at 20.00° C./minute to 200.00° C., then ramp cool at 20.00° C./minute to (−30.00° C.), then ramp heat at 20.00° C./minute to 200.00° C., with a data collection rate of one data point per second. The enthalpy of fusion is evaluated by a linear integration of the endothermic transition in the range of 35° C.-85° C. using commercial software (available under the trade designation UNIVERSAL ANALYSIS 2000 software from TA Instruments).

As used herein, a "resin" contains all polymerizable components (monomers, oligomers and/or polymers) being present in a polymerizable composition. The resin may contain only one polymerizable component compound or a mixture of different polymerizable compounds.

As used herein, the term "glass transition temperature" ($T_g$), of a polymer refers to the transition of a polymer from a glassy state to a rubbery state and can be measured using Differential Scanning Calorimetry (DSC), such as at a heating rate of 10° C. per minute in a nitrogen stream. A suitable DSC method and mode of analysis is as described in Matsumoto, A. et. al., J. Polym. Sci. A., Polym. Chem. 1993, 31, 2531-2539.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

As used herein, the term "essentially free" in the context of a composition being essentially free of a component, refers to a composition containing less than 1% by weight (wt. %), 0.5 wt. % or less, 0.25 wt. % or less, 0.1 wt. % or less, 0.05 wt. % or less, 0.001 wt. % or less, or 0.0001 wt. % or less of the component, based on the total weight of the composition.

One of the challenges presented by solventless processing of primer compositions is the difficulty in making defect-free thin primer coatings via extrusion processes that are substantially less than about 2 micrometers in thickness. On the other hand, due to the prevalence of solvent-based primers, there is coating equipment available to make primer coatings that are less than 1 micrometer in thickness. It would thus be useful to provide alternate technologies that deliver very thin primer coatings using such coating equipment.

Water-soluble polyamides based on oxyalkylene diamines among other polyamide forming comonomers, are known in the art (see, e.g., U.S. Pat. No. 5,866,675, Ahmed et al.). A disadvantage of such polyamides, however, is that the oxyalkylene content makes the performance of such polyamides sensitive to humidity conditions during product use. Cationically charged water-soluble polyamides are also known in the art (see, e.g., U.S. Pat. No. 3,058,873, Keim et al.). A disadvantage of such polyamides is that such cationically water-soluble polyamides are known to be thermally unstable due to the presence of quaternary ammonium groups along the polyamide backbone. Polyamides with metal salts of sulfonate anions that are pendant from the backbone are known in the art and have been used for preparing hydrophilic compositions for staining nylon fibers with cationic dyes or for creating water soluble lithographic compositions. For example, U.S. Pat. No. 3,709,865 (Lofquist et al.) discloses that even going from nylon 6,6 monomers such as adipic acid and hexamethylene diamine used to prepare sulfonated polyamides to the less polar caprolactam monomer results in insoluble metal salts of the sulfonated monomer. It was unexpectedly discovered that sulfonated polyamide ionomers according to the present disclosure can successfully be prepared to have a mole fraction of 0.40 or greater of a dimer acid, resulting in significantly greater hydrophobicity than even sulfonated polyamides prepared with caprolactam.

It has been discovered that water-dispersible, yet water-resistant dimer acid-based ionomer polyamides can be prepared that can function as effective primers for a variety of polymers with pendant carboxylic acid groups and polar substrates (e.g., backings). The ionomer polyamides described herein can be applied as a thin layer (e.g., under 2 micrometers) using common coating equipment.

The ionomer polyamides according to the present disclosure preferably lack ester bonds in their backbone making such polyamides more thermally and hydrolytically stable than sulfonated polyesters or sulfonated polyesteramides. The inclusion of a dimer acid monomer results in an amorphous, branched polyamide ionomer, characterized by being amorphous (e.g., the presence of low to no crystalline phases) and polydispersities greater than two due to the trifunctionality in the dimer acid. The inclusion of a dimer acid monomer also results in significant biobased content in the ionomer polyamides. The solventless synthesis, water-based coatings and biobased content provide environmentally favorable primer technology. Further, the ionomer polyamides may have the added benefit of functioning as improved barriers for hydrophobic substances such as mineral oil and plasticizers such as dioctyl phthalate.

Ionomer Polyamides

In a first aspect, an ionomer polyamide is provided. The ionomer polyamide comprises a reaction product of a polymerizable composition comprising:

a) first diacid that is a dimer acid;

b) an ionomer component;

c) a first diamine that is an oxyalkylene diamine;

d) at least one second diamine comprising a primary diamine and/or a secondary diamine; and e) optionally at least one second diacid, wherein a mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, ionomer component, and at least one second diacid used to form the ionomer polyamide; and wherein a mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer polyamide.

It is to be understood that a sum of all the mole fractions of a particular group of listed components (e.g., diacids, diamines, etc.) will add up to 1.0.

Preferably, the polymerizable composition is essentially free of (e.g., lacks) a diol, which results in an ionomer polyamide that is essentially free of ester bonds. As mentioned above, the presence of ester bonds in a polymer decreases the thermal and hydrolytic stability of the polymer.

Each of the components a) through d) of the polymerizable composition are described in detail below.

a) First Diacid

The polymerizable composition comprises a first diacid. The first diacid is a dimer acid. A dimer acid is a dimerized acid that is a dicarboxylic acid typically formed by dimerizing one or more unsaturated fatty acids.

In some embodiments, the dicarboxylic dimer acid may include at least one alkyl or alkenyl group and may contain 12 to 100 carbon atoms, 16 to 100 carbon atoms, or 18 to 100 carbon atoms and is characterized by having two carboxylic acid groups. The dimer acid may be saturated or partially unsaturated. In some embodiments, the dimer acid may be a dimer of a fatty acid. The phrase "fatty acid," as used herein means an organic compound composed of an alkyl or alkenyl group containing 5 to 22 carbon atoms and characterized by a terminal carboxylic acid group. Useful fatty acids are disclosed in "Fatty Acids in Industry: Processes, Properties, Derivatives, Applications", Chapter 7, pp 153-175, Marcel Dekker, Inc., 1989. In some embodiments, the dimer acid may be formed by the dimerization of unsaturated fatty acids having 18 carbon atoms such as oleic acid or tall oil fatty acid. The dimer acids are often at least partially unsaturated and often contain 36 carbon atoms. The dimer acids may be relatively high molecular weight and made up of mixtures comprising various ratios of a variety of large or relatively high molecular weight substituted cyclohexenecarboxylic acids, predominately 36-carbon dicarboxylic dimer acid. Component structures may be acyclic, cyclic (monocyclic or bicyclic) or aromatic, as shown below.

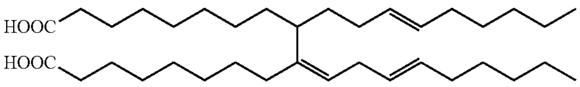

(acylic)

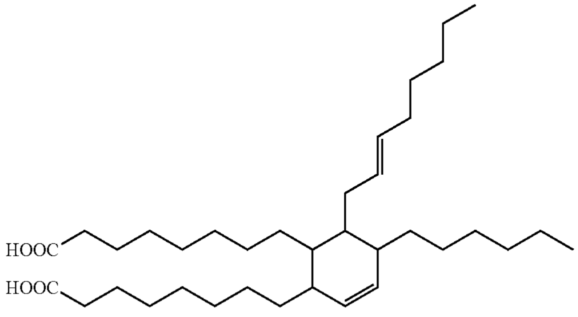

monocyclic

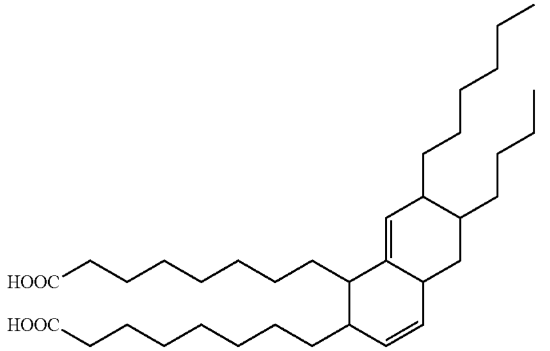

(bicyclic)

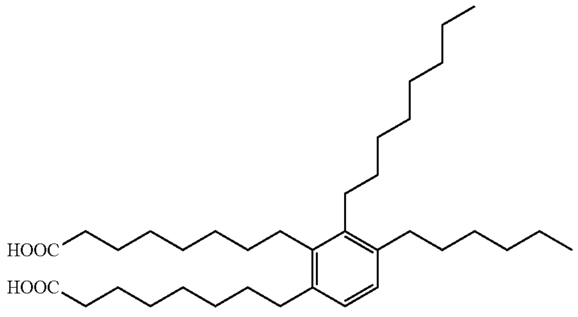

aromatic

The dimer acids may be prepared by condensing unsaturated monofunctional carboxylic acids such as oleic, linoleic, soya or tall oil acid through their olefinically unsaturated groups, in the presence of catalysts such as acidic clays. The distribution of the various structures in dimer acids (nominally C36 dibasic acids) depends upon the unsaturated acid used in their manufacture. Typically, oleic acid gives a dicarboxylic dimer acid containing about 38% acyclics, about 56% mono- and bicyclics, and about 6% aromatics. Soya acid gives a dicarboxylic dimer acid containing about 24% acyclics, about 58% mono- and bicyclics and about 18% aromatics. Tall oil acid gives a dicarboxylic dimer acid containing about 13% acyclics, about 75% mono- and bicyclics and about 12% aromatics. The dimerization procedure also produces trimer acids. In certain embodiments, the dimer acid comprises less than 10 mol % triacid content. The commercial dimer acid products are typically purified by distillation to produce a range of dicarboxylic acid content. Useful dimer acids contain at least 80% dicarboxylic acid, more preferably 90% dicarboxylic acid content, even more preferably at least 95% dicarboxylic acid content. For certain applications, it may be advantageous to further purify the dimer acid by color reduction techniques including hydrogenation of the unsaturation, as disclosed in U.S. Pat. No. 3,595,887, which is incorporated herein by reference in its entirety. Hydrogenated dimer acids may also provide increased oxidative stability at elevated temperatures. Other useful dimer acids are disclosed in Kirk-Othmer Encyclopedia of Chemical Technology, Organic Chemicals: Dimer Acids (ISBN 9780471238966), copyright 1999-2014, John Wiley and Sons, Inc. Commercially available dicarboxylic dimer acids are available under the trade designation EMPOL1008 and EMPOL1061 both from BASF, Florham Park, New Jersey and PRIPOL 1006, PRIPOL 1009, PRIPOL 1013, PRIPOL 1017 and PRIPOL 1025 all from Croda Inc., Edison, New Jersey, for example.

In some cases, the dimer acid has a number average molecular weight of 300 grams per mole (g/mol) or greater, 350 g/mol, 400 g/mol, 450 g/mol, 500 g/mol, 550 g/mol, 600 g/mol, 650 g/mol, 700 g/mol, 750 g/mol, or 800 g/mol or greater; and 1400 g/mol or less, 1350 g/mol, 1300 g/mol, 1250 g/mol, 1200 g/mol, 1150 g/mol, 1000 g/mol, 950 g/mol, 800 g/mol, 750 g/mol, or 700 g/mol or less. Stated another way, the dimer acid may have a number average molecular weight of between 300 g/mol and 1400 g/mol, 300 g/mol to 1200 g/mol, 300 g/mol to 1000 g/mol, or 300 g/mol to 800 g/mol. Number average molecular weight may be determined using gel permeation chromatography (GPC). In some embodiments, the number of carbon atoms in the dimer acid may be between from 12 to 100, between from 20 to 100, between from 30 to 100, between from 12 to 80, between from 20 to 80, between from 30 to 80, between from 12 to 60, between from 20 to 60 or even between from 30 to 60.

A mole fraction of the dimer acid, based on the total moles of a combination of the dimer acid, at least one second diacid, and any ionomer diacid or diester (e.g., a total of all diacids) used to form the ionomer polyamide, is 0.40 or greater, 0.42, 0.45, 0.47, 0.50, 0.52, 0.55, 0.57, 0.60, 0.62, 0.65, 0.67, 0.70, 0.72, or 0.75 or greater; and 0.99 or less, 0.98, 0.97, 0.96, 0.95, 0.94, 0.93, 0.92, 0.91, 0.90, 0.87, 0.85, 0.82, 0.80, 0.77, 0.75, 0.72, 0.70, 0.67, 0.65, 0.62, or 0.60 or less, based on the total moles of a combination of the dimer acid, at least one second diacid, and any ionomer diacid or diester used to form the ionomer polyamide. Stated another way, a mole fraction of the dimer acid may be 0.40 to 0.95, 0.50 to 0.90, or 0.60 to 0.85, based on the total moles of a combination of the dimer acid, at least one second diacid, and any ionomer diacid or diester used to form the ionomer polyamide.

b) Ionomer Component

The polymerizable composition comprises an ionomer component. The ionomer component may be any of an ionomer diacid, an ionomer diester, and/or an ionomer diamine. It is to be understood that the term "diacid" when used herein to refer to total moles of diacid encompasses diesters because both groups react with amines to form amide bonds. The difference is that an acid will react with an amine to form an amide bond and water by-product whereas the ester will react with an amine to form an amide bond and the corresponding alcohol. Typically, polymerizable compositions according to the present disclosure contain a 1.01-1.2 or 1.01-1.05 molar excess of amine; however, in certain embodiments instead contain an equal molar ratio (1.0:1.0) or a molar excess of acid (e.g., 1.05). A molar excess of acid monomers will result in an acid terminated ionomer polyamide and a molar excess of amine monomers will result in an amine terminated polyamide. Use of an ionomer diamine may contribute to forming an amine terminated polyamide.

It was unexpectedly discovered that an ionomer polyamide incorporating an ionomer component was suitable for use as a primer due to the presence of the ionic charges in what is typically a hydrophobic material.

Suitable ionomer diacids and ionomer diesters include a phthalate ionomer, such as a sodium sulfate isophthalate (SSIP). The ionomer typically contains one or more dicarboxylic or diester moieties derived from phthalate, isophthalate, terephthalate, and/or naphthalate. The counter ion can be H+ or other metal ions such as potassium, lithium, zinc, magnesium, calcium, cobalt, iron, and/or antimony. In some embodiments, the ionomer component comprises an aryl group. The ionomer diacid or diester may preferably comprise a sodium salt of dimethyl 5-sulfoisophthalate (DMSSIP). Another suitable ionomer diacid is of Formula (V) below:

(V)

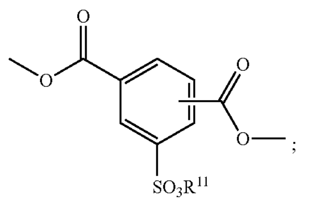

wherein R11 is selected from ammonium, sodium, lithium, and potassium.

Such ionomer diacids having acid substituents at the 1,3 or 1,4 positions are described in detail in U.S. Pat. No. 3,389,549 (David).

Suitable ionomer diamines include a sulfonalkylalkylenediamine, such as one having the formula of N—N(H)—R9-NH—$(CH_2)_y$—$SO_3$R10, wherein R9 is an alkylene having 2-12 carbon atoms or a cycloalkylene, y is an integer of 4-6, and R10 is H or an alkali metal. Another suitable ionomer diamine is of the Formula (VI) below:

(VI)

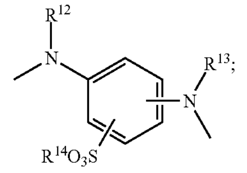

wherein R12 and R13 are independently selected from H and a lower alkyl and R14 is selected from H, an ammonium radical, a Group I alkali metal, and a Group II alkaline earth metal. In some cases, R12 and R13 are the same.

Such ionomer diamines are described in detail in U.S. Pat. No. 3,454,535 (Bodesheim et al.) and U.S. Pat. No. 3,184,436 (Magat).

As mentioned above, a mole fraction of the ionomer component is 0.01 to 0.20, based on the total moles of either a combination of the dimer acid, at least one second diacid, and any ionomer diacid or diester used to form the ionomer polyamide, or a combination of the oxyalkylene diamine, the at least one second diamine, and any ionomer diamine used to form the ionomer polyamide. As such, a mole fraction of the ionomer component is 0.01 or greater, 0.02, 0.03, 0.04, 0.05, 0.06, 0.07, 0.08, 0.09, or 0.10 or greater; and 0.20 or less, 0.19, 0.18, 0.17, 0.16, 0.15, 0.14, 0.13, 0.12, 0.11, or 0.10 or less.

c) First Diamine

The polymerizable composition comprises a first diamine. The first diamine is an oxyalkylene diamine. In some embodiments, the oxyalkylene diamine comprises each of an ethylene oxide and a propylene oxide. Suitable oxyalkylene diamines include those commercially available from Hunstman Corporation (The Woodlands, TX) under the trade designation JEFFAMINE ED series, including ED-600, ED-900, and ED-2003 and the PPG based diamines commercially available from BASF (Florham Park, New Jersey) under the trade designation BAXXODUR EC (e.g., EC 301, EC 302, and EC 303). In select embodiments, JEFFAMINE ED-2003 is preferred as the oxyalkylene diamine, due to its molecular weight of approximately 2000 g/mol.

As mentioned above, a mole fraction of the oxyalkylene diamine is 0.005 to 0.10, such as 0.01 to 0.03, based on the total moles of a combination of the oxyalkylene diamine, the at least one second diamine, and any ionomer diamine (e.g., a total of all diamines) used to form the ionomer polyamide. As such, a mole fraction of the oxyalkylene diamine is 0.005 or greater, 0.006, 0.007, 0.008, 0.009, 0.010, 0.012, 0.015, 0.017, 0.020, 0.022, 0.025, 0.027, 0.030, 0.032, 0.035, 0.037, 0.040, 0.042, 0.045, 0.047, 0.050, 0.052, 0.055, 0.057, or 0.060 or greater; and 0.100 or less, 0.095, 0.090, 0.085, 0.080, 0.075, 0.070, 0.065, 0.060, 0.055, 0.050, 0.045, 0.040, 0.035, 0.030, or 0.025 or less, based on the total moles of a combination of the oxyalkylene diamine, the at least one second diamine, and any ionomer diamine used to form the ionomer polyamide.

In certain embodiments, a molar ratio of the oxyalkylene diamine to the ionomer component is preferably between 0.10 moles oxyalkylene to 1.0 mole ionomer component (i.e., 0.10:1.0) to 2.0:1.0; such as 0.15:1.0 to 1.0:1.0, or even 0.20:1.0 to 0.50:1.0 moles oxyalkylene diamine to moles ionomer component. When the molar ratio of oxyalkylene diamine to ionomer component is below 0.10:1.0, the dispersions tend to contain large particles and when the ratio is much above 1.0:1.0 the dispersions tend to have an overly thick (e.g., hand lotion) consistency.

d) Second Diamine

The polymerizable composition comprises at least one second diamine. By "at least one second diamine" is meant that the polymerizable composition contains one or more diamine components in addition to, and distinct from, the first diamine described in detail above as component c) and the ionomer component when it is an ionomer diamine described in detail above with respect to component b). Often, the at least one second diamine includes two or more different diamines, e.g., two diamines, three diamines, four diamines, etc.

In some embodiments, the diamine component may include one or more secondary diamines or one or more secondary/primary hybrid diamines and, optionally, one or more primary diamines, such as both a primary diamine and a secondary diamine.

Optionally, the at least one second diamine comprises an alkyl group, an alkylene group, an aryl group, a cycloalkyl group, or any combination thereof. For instance, the at least one second diamine can include each of an aliphatic diamine and a cycloaliphatic diamine.

In some embodiments, suitable secondary or secondary/primary hybrid amines may have the Formula (IV):

R7-NH—R8-NH—R7 (IV);

where R8 is an:

alkylene (e.g., —$CH_2CH_2CH_2$—), branched alkylene (—$CH_2CH(Me)CH_2$—), cycloalkylene (e.g., -cyclohexylene-$CH_2$-cyclohexylene-), substituted or unsubstituted arylene (e.g., -1,4-Phenylene-), heteroalkylene (e.g., —$CH_2CH_2$—O—$CH_2CH_2$— or any other Jeffamine), or heterocycloalkylene (e.g., —$CH_2$-furan ring-$CH_2$—)

and each R7, independently, is a:

linear or branched alkyl (e.g., -Me, -isopropyl), cycloalkyl (e.g., -cyclohexyl), aryl (e.g., -phenyl), heteroalkyl (e.g., —$CH_2CH_2$—O—$CH_3$), heteroaryl (e.g., -2-substituted-pyridyl), or hydrogen atom, with the proviso that both R1s are not hydrogen atoms, or the R7 groups are alkylene or branched alkylene and form a heterocyclic compound (e.g., piperazine).

Suitable secondary diamines may include, for example, piperazine, 1,3-Di-4-piperidylpropane, 4,4'-Methylenebis [N-sec-butylaniline], and cyclohexanamine, 4,4'-methylenebis[N-(1-methylpropyl)-. In some embodiments, suitable secondary/primary hybrid diamines (i.e., diamines having a secondary amine and a primary amine) include, for example, 2-aminoethyl piperazine. In some embodiments, the secondary/primary hybrid diamines may not be present or may be present such that a mole fraction of the secondary/primary hybrid diamines is less than 0.50, 0.40 or less, 0.30, 0.20, 0.10, or 0.05 or less, based on the total moles of the second diamines. In some embodiments, the number average molecular weight of suitable secondary diamines or secondary/primary hybrid diamines may be from 30 g/mol to 5000 g/mol, 30 g/mol to 500 g/mol, or 50 g/mol to 100 g/mol.

In some embodiments, the at least one second diamine component may, in addition to the (optional) secondary or secondary/primary hybrid amine, include a primary diamine, such as an aliphatic or aromatic primary amine. Suitable primary amines include, for example, ethylenediamine, m-xylylenediamine, 1,6-hexanediamine, o-toluidine, or 1,3-benzenedimethanamine. In some embodiments, the number average molecular weight of suitable primary diamines may be from 30 g/mol to 5000 g/mol, 30 g/mol to 500 g/mol, or 50 g/mol to 100 g/mol.

In select embodiments, the at least one second diamine is of the Formula (III):

R5-NH—R6-NH—R5 (III);

wherein R5 is independently selected from a linear or branched alkyl, a cycloalkyl, an aryl, a heteroalkyl, a heteroaryl, a hydrogen atom with the proviso that both R5s are not hydrogen atoms, or the R5 groups are alkylene or branched alkylene and form a heterocyclic compound; and wherein R6 is an alkylene, a branched alkylene, a cycloalkylene, a substituted or unsubstituted arylene, or a heteroalkylene.

As mentioned above, a mole fraction of the at least one second diamine is 0.70 to 0.995, based on the total moles of a combination of the oxyalkylene diamine, the at least one second diamine, and any ionomer diamine (e.g., a total of all diamines) used to form the ionomer polyamide. As such, a mole fraction of the at least one second diamine is 0.700 or greater, 0.710, 0.720, 0.730, 0.740, 0.750, 0.760, 0.770, 0.780, 0.790, 0.800, 0.810, 0.820, 0.830, 0.840, 0.850, 0.860, 0.870, 0.880, 0.890, 0.900, 0.905, 0.910, 0.915, 0.920, 0.925, 0.930, 0.935, 0.940, 0.945, 0.950, 0.955, or 0.960 or greater; and 0.995 or less, 0.995, 0.990, 0.985, 0.980, 0.975, 0.970, 0.965, 0.960, 0.955, 0.950, 0.945, 0.940, 0.935, 0.930, 0.910, 0.890, 0.870, 0.850, 0.830, 0.810, 0.790, 0.770, or 0.750 or less, based on the total moles of a combination of the oxyalkylene diamine, the at least one second diamine, and any ionomer diamine used to form the ionomer polyamide.

e) Second Diacid

The polymerizable composition optionally comprises at least one second diacid. By "at least one second diacid" is meant that the polymerizable composition contains one or more diacid components in addition to, and distinct from, the first diacid (that is a dimer acid) described in detail above as component a) and the ionomer component when it is an ionomer diacid or an ionomer diester described in detail above with respect to component b).

Suitable exemplary diacids include for instance and without limitation, hexanedioic acid, nonanedioic acid, dodecanedioic acid, 1,3-benzenedicarboxylic acid, 1,4-benzenedicarboxylic acid, and 11-aminoundecanoic acid.

As mentioned above, a mole fraction of the at least one second diacid, based on the total moles of a combination of the dimer acid, at least one second diacid, and any ionomer diacid or diester (e.g., a total of all diacids) used to form the ionomer polyamide, is 0 to 0.60. Stated another way, a mole fraction of the at least one second diacid may be 0 (i.e., not present), 0.01 or greater, 0.02, 0.05, 0.07, 0.10, 0.12, 0.15, 0.17, 0.20, 0.22, 0.25, 0.27, 0.30, 0.32, or 0.35 or greater; and 0.60 or less, 0.58, 0.57, 0.56, 0.55, 0.54, 0.53, 0.52, 0.51, 0.50, 0.47, 0.45, 0.42, 0.40, 0.37, 0.35, 0.32, 0.30, 0.27, 0.25, 0.22, or 0.20 or less, based on the total moles of a combination of the dimer acid, at least one second diacid, and any ionomer diacid or diester used to form the ionomer polyamide.

Reaction Product of the Polymerizable Composition

As mentioned above, a reaction product of the polymerizable composition is an ionomer polyamide. Preferably, the ionomer polyamide is acid- or amine-terminated. The ionomer polyamide typically lacks ester groups. The ionomer polyamide has a glass transition temperature of less than 25 degrees Celsius, 20° C. or less, 15° C., 10° C., 5° C., 0° C., −5° C., −10° C., −15° C., −20° C., −25° C., −30° C. or less; and −50° C. or greater.

In select embodiment, the ionomer polyamide is of the structure of Formula (I) or Formula (II):

(I)

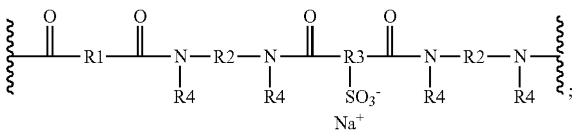

(II)

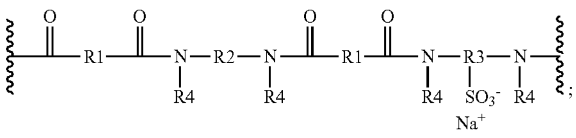

wherein R1 is independently selected from a residue of the dimer acid (e.g., any of the dimer acids described above), a residue of the ionomer diacid or diester (e.g., any of the ionomer diacids or diesters described above), or a residue of any other diacid monomers (e.g., any of the at least one second diacids described above).

wherein R2 is independently selected from a residue of a primary diamine or a secondary diamine (e.g., any of the primary or secondary diamines described above);

wherein R3 is independently selected from an alkylene group or an arylene group; and wherein R4 is independently selected from H, an alkyl group, an alkenyl group, an aryl group, a cycloalkyl group, or two R4 groups are alkylene or branched alkylene and form a heterocyclic compound.

In certain embodiments, at least one R2 is a residue of an oxyalkylene diamine and at least one R3 is an arylene group.

Primers

In a second aspect, the present disclosure provides a primer. The primer comprises up to 20 percent by weight of the ionomer polyamide according to the first aspect described in detail above. Optionally, the ionomer polyamide is acid- or amine-terminated and the primer has a pH of 2-6 or 8-12.

In certain embodiments, the primer is essentially free of (e.g., lacks) a surfactant, as typically ionomer polyamides according to at least certain embodiments of the present disclosure advantageously does not require a surfactant to remain dispersed in an aqueous composition. In some cases, however, a surfactant may be included in a primer when the primer is used in high speed coating processes.

In some embodiments, the ionomer polyamide is dispersed in a solvent comprising 80-90 percent by weight water, 10-20 percent by weight of a C2-C4 aliphatic alcohol (with the total water and C2-C4 aliphatic alcohol equaling 100 percent), and optionally a pH adjusting agent. From such a solvent blend, it is unexpectedly possible to strip out the C2-C4 aliphatic alcohol, e.g., at an elevated temperature such as 60-80 degrees Celsius. Hence, in some embodiments, the ionomer polyamide is dispersed in water, advantageously providing an aqueous primer dispersion. Without wishing to be bound by theory, it is believed that nonionic portions of the ionomer polyamide can form droplets of about 50 nanometers to 1000 nanometers in size and the ionic portions of the ionomer polyamide interact with the water to assist in keeping the ionomer polyamide dispersed in the water. It has surprisingly been discovered that aqueous dispersions containing the ionomer polyamide in an amount of up to 20 percent by weight can be stable for 1 month or longer, 2 months, 3 months, 4 months, 5 months, 6 months, 7 months, 8 months, 9 months, 10 months, 11 months, or even 12 months or longer.

Articles

In a third aspect, the present disclosure provides an article. Referring to FIG. 1, a schematic cross-sectional view is provided of an exemplary article 100. In embodiments of the third aspect, the article 100 comprises a substrate 110 and a layer 120 of the ionomer polyamide (according to the first aspect described in detail above) disposed on a major surface 112 of the substrate 110. In select embodiments, the ionomer polyamide may exhibit properties of a pressure sensitive adhesive (PSA), including a low shear modulus (e.g., between the substrate and the ionomer polyamide) of 0.01 megapascals (MPa) or greater at 25 degrees Celsius, such as 0.02 MPa, 0.04 MPa, 0.06 MPa, 0.08 MPa, 0.10 MPa, 0.12 MPa, 0.14 MPa, 0.16 MPa, 0.18 MPa, 0.20 MPa, 0.25 MPa, 0.30 MPa, 0.35 MPa, 0.40 MPa, 0.45 MPa, 0.50 MPa, 0.60 MPa, 0.70 MPa, 0.80 MPa, 0.90 MPa, 1 MPa, 1.1 MPa, 1.2 MPa, 1.3 MPa, 1.4 MPa, 1.5 MPa, 1.6 MPa, 1.7 MPa, 1.8 MPa, 1.9 MPa, or 2 MPa or greater; and 3 MPa or less.

In a fourth aspect, the present disclosure provides another article. Referring again to FIG. 1, in embodiments of the fourth aspect, the article 100 comprises a substrate 110 and a layer 120 of the ionomer primer (according to the second aspect described in detail above) disposed on a major surface 112 of the substrate 110.

The article preferably exhibits a shear modulus (e.g., between the substrate and the ionomer polyamide or the primer) of greater than 5 megapascals (MPa) at 25 degrees Celsius, such as 6 MPa or greater, 7 MPa, 8 MPa, 9 MPa, 10 MPa, 11 MPa, 12 MPa, 13 MPa, 14 MPa, 15 MPa, 16 MPa, 17 MPa, 18 MPa, 19 MPa, or even 20 MPa or greater.

Optionally, the article of the third aspect or the fourth aspect further comprises an adhesive. Referring to FIG. 2, a schematic cross-sectional view is provided of another exemplary article 200. The article 200 comprises a substrate 210 and a layer 220 of the ionomer polyamide (according to the first aspect described in detail above) or the primer (according to the second aspect described in detail above) disposed on a major surface 212 of the substrate 210. The article 200 further comprises an adhesive 230 disposed on a major surface 222 of the layer 220 of the ionomer polyamide or the primer. The adhesive may comprise a polymer comprising at least one pendant carboxylic acid group. Additionally, acrylic adhesives with acrylic acid as a comonomer are suitable for use in exemplary articles.

Advantageously, in any article according to the present disclosure, the layer of the ionomer polyamide or the primer can have an average thickness of less than 1 micrometer, such as 0.9 micrometers or less, 0.8 micrometers, 0.7 micrometers, 0.6 micrometers, 0.5 micrometers, 0.4 micrometers, 0.3 micrometers, 0.2 micrometers, or 0.1 micrometers or less. In some cases, the dry primer (e.g., layer of ionomer polyamide) has an average thickness of less than 1 micrometer, less than 0.5 micrometers, or less than 0.25 micrometers; and 0.05 micrometers or greater.

Exemplary substrates may be at least one of a metal, a ceramic, or a polymer, e.g., a thermoplastic polymer. In any article of the third aspect or the fourth aspect, the substrate optionally comprises a polar polymeric material. Advantageously, the ionomer polyamide can be a particularly effective primer for a variety of polymers having polar groups (e.g., pendant carboxylic acid groups).

A polymer substrate may comprise any of a variety of materials including polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(meth)acrylates such as polymethylmethacrylate; polyurethanes; polyvinyl chloride; polycyclo-olefins; polyimides; glass; paper; or combinations or blends thereof. Particular examples include polyethylene terephthalate, polymethyl methacrylate, polyvinyl chloride, and cellulose triacetate. Preferable examples include polyethylene terephthalate, polyethylene naphthalate, cellulose triacetate, polypropylene, polyester, polycarbonate, polymethylmethacrylate, polyimide, polyamide, or a blend thereof. The substrate may also be an orientable film such as a cast web substrate that is coated before orientation in a tentering operation.

Methods

In a fifth aspect, the present disclosure provides a method of making an ionomer polyamide. The method comprises reacting components of a polymerizable composition comprising:

a) a first diacid that is dimer acid;

b) an ionomer component that is an ionomer diacid, an ionomer diester, and/or an ionomer diamine;

c) a first diamine that is an oxyalkylene diamine;

d) at least one second diamine comprising a primary diamine and/or a secondary diamine; and e) optionally at least one second diacid, wherein a mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid, and any ionomer diacid or diester used to form the ionomer polyamide; and a mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer polyamide.

The ionomer polyamide is according to any embodiment of the first aspect described above in detail.

Referring to FIG. 3, a flow chart is provided of an exemplary method of making an ionomer polyamide. In the method, Step 310 includes to react components of a polymerizable composition comprising: a) a first diacid that is a dimer acid; b) an ionomer component that is an ionomer diacid, an ionomer diester, and/or an ionomer diamine; c) a first diamine that is an oxyalkylene diamine; d) at least one second diamine comprising a primary diamine and/or a secondary diamine; and e) optionally at least one second diacid, wherein a mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid, and any ionomer diacid or diester used to form the ionomer polyamide; and a mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer polyamide.

The ionomer polyamide may be formed following a conventional condensation reaction between the components a) through d) (and optionally e) of the polymerizable composition. In some embodiments, reacting comprises refluxing the polymerizable composition followed by distillation.

As mentioned above, U.S. Pat. No. 3,709,865 (Lofquist et al.) discloses that even going from nylon 6,6 monomers such as adipic acid and hexamethylene diamine used to prepare sulfonated polyamides to the less polar caprolactam monomer results in insoluble metal salts of the sulfonated monomer. For instance, too much sulfonated material makes synthesis difficult due to phase separation. It was thus unexpected that an ionomer polyamide could successfully be synthesized using the components described above, particularly a dimer acid, which tends to be hydrophobic.

Acid terminated ionomer polyamide dispersions may be prepared having enhanced stability imparted by modifying the pH of the aqueous phase to the 8-12 range, more preferably the 8-10 range by adding one or more pH adjusters. The pH modification is accomplished by adding one or more Bronsted bases such as sodium hydroxide or ammonium hydroxide, or organic bases such as triethylamine, during the dispersion process itself. Amine terminated ionomer polyamide dispersions may be prepared having enhanced stability imparted by modifying the pH of the aqueous phase to the 2-6 range, more preferably the 3-5 range. The modification is accomplished by adding one or more Bronsted acids such as hydrochloric acid, or organic acids such acetic acid, during the dispersion process itself. In certain embodiments, acetic acid is a preferred acid and either sodium hydroxide or potassium hydroxide is a preferred base. Moreover, such pH adjusters may be flashed off when a coating is made and thus no longer remain in the resulting layer of ionomer polyamide or primer.

In a sixth aspect, a method of making an article is provided. The method comprises:

coating the primer according to the second aspect described in detail above on a major surface of a substrate; and orienting the substrate.

Referring to FIG. 4, a flow chart is provided of an exemplary method of making an article. In the method, Step 410 includes to coat the primer according to the second aspect on a major surface of a substrate and Step 420 includes to orient the substrate. Often, a substrate is oriented in a length (e.g., machine) direction prior to coating the primer on the substrate. In cases where the substrate is biaxially oriented, the primer may thus only be present on the substrate for orientation in the transverse direction (e.g., tenter orientation). Alternatively, it is possible to coat the primer on a substrate prior to any orientation, either uniaxial or biaxial orientation.

Optionally, the method further includes Step 430 to at least one of heat or dry the primer, thereby obtaining a layer of the ionomer polyamide having an average thickness of less than 1 micrometer, such as 0.9 micrometers or less, 0.8 micrometers, 0.7 micrometers, 0.6 micrometers, 0.5 micrometers, 0.4 micrometers, 0.3 micrometers, 0.2 micrometers, or 0.1 micrometers or less. In some cases, the dry primer (e.g., layer of ionomer polyamide) has an average thickness of less than 1 micrometer, less than 0.5 micrometers, or less than 0.25 micrometers; and 0.05 micrometers or greater.

An additional optional step is shown in FIG. 4, Step 440 to apply a layer of an adhesive on a major surface of the layer of the ionomer polyamide. The adhesive may be any adhesive mentioned above with respect to the third and fourth aspects.

EXEMPLARY EMBODIMENTS

In a first embodiment, the present disclosure provides an ionomer polyamide. The ionomer polyamide comprises a reaction product of a polymerizable composition comprising: a diacid that is a dimer acid; an ionomer component that is an ionomer diacid, an ionomer diester, and/or an ionomer diamine; a first diamine that is an oxyalkylene diamine; at least one second diamine comprising a primary diamine and/or a secondary diamine; and optionally at least one second diacid. A mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid, and any ionomer diacid or diester used to form the ionomer polyamide. A mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer polyamide.

In a second embodiment, the present disclosure provides an ionomer polyamide according to the first embodiment, wherein the oxyalkylene diamine comprises each of an ethylene oxide and a propylene oxide.

In a third embodiment, the present disclosure provides an ionomer polyamide according to the first embodiment or the second embodiment, wherein a mole fraction of the oxyalkylene diamine is 0.005 to 0.10 or 0.01 to 0.03, based on the total moles of a combination of the oxyalkylene diamine, the at least one second diamine, and any ionomer diamine used to form the ionomer polyamide.

In a fourth embodiment, the present disclosure provides an ionomer polyamide according to the second embodiment or the third embodiment, wherein the ionomer polyamide is acid- or amine-terminated.

In a fifth embodiment, the present disclosure provides an ionomer polyamide according to any of the first through fourth embodiments, wherein the at least one second diamine comprises an alkyl group, an alkylene group, an aryl group, a cycloalkyl group, or any combination thereof.

In a sixth embodiment, the present disclosure provides an ionomer polyamide according to any of the first through fifth embodiments, wherein the at least one second diamine comprises both a primary diamine and a secondary diamine.

In a seventh embodiment, the present disclosure provides an ionomer polyamide according to any of the first through sixth embodiments, wherein the at least one second diamine comprises an aliphatic diamine and a cycloaliphatic diamine.

In an eighth embodiment, the present disclosure provides an ionomer polyamide according to any of the first through seventh embodiments, wherein the at least one second diamine is of the Formula (III):

R5-NH—R6-NH—R5 (III).

R5 is independently selected from a linear or branched alkyl, a cycloalkyl, an aryl, a heteroalkyl, a heteroaryl, a hydrogen atom with the proviso that both R5s are not hydrogen atoms, or the R5 groups are alkylene or branched alkylene and form a heterocyclic compound. R6 is an alkylene, a branched alkylene, a cycloalkylene, a substituted or unsubstituted arylene, or a heteroalkylene.

In a ninth embodiment, the present disclosure provides an ionomer polyamide according to any of the first through eighth embodiments, wherein the ionomer component comprises an aryl group.

In a tenth embodiment, the present disclosure provides an ionomer polyamide according to any of the first through ninth embodiments, wherein the ionomer component comprises a sodium salt of dimethyl 5-sulfoisophthalate.

In an eleventh embodiment, the present disclosure provides an ionomer polyamide according to any of the first through tenth embodiments, wherein a mole fraction of the dimer acid is 0.40 to 0.95, 0.50 to 0.90, or 0.60 to 0.85, based on the total moles of a combination of the dimer acid, the at least one second diacid, and any ionomer diacid or diester used to form the ionomer polyamide.

In a twelfth embodiment, the present disclosure provides an ionomer polyamide according to any of the first through eleventh embodiments, wherein the dimer acid has a number average molecular weight of between 300 g/mol and 1400 g/mol.

In a thirteenth embodiment, the present disclosure provides an ionomer polyamide according to any of the first through twelfth embodiments, wherein the dimer acid comprises 36 carbon atoms.

In a fourteenth embodiment, the present disclosure provides an ionomer polyamide according to any of the first through thirteenth embodiments, wherein the dimer acid comprises less than 10 mol % triacid content.

In a fifteenth embodiment, the present disclosure provides an ionomer polyamide according to any of the first through fourteenth embodiments, wherein the polymerizable composition lacks a diol.

In a sixteenth embodiment, the present disclosure provides an ionomer polyamide according to any of the first through fifteenth embodiments, wherein the ionomer polyamide lacks ester groups.

In a seventeenth embodiment, the present disclosure provides an ionomer polyamide according to any of the first through sixteenth embodiments, wherein the ionomer polyamide has a glass transition temperature of less than 25 degrees Celsius.

In an eighteenth embodiment, the present disclosure provides an ionomer polyamide according to any of the first through seventeenth embodiments, wherein the ionomer polyamide is of the structure of Formula (I) or Formula (II):

(I)

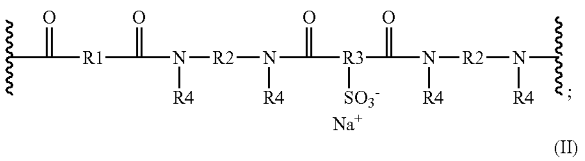

(II)

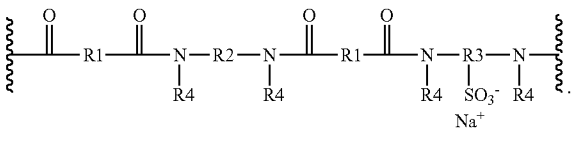

R1 is independently selected from a residue of the dimer acid, a residue of the ionomer diacid or diester, or a residue of any other diacid monomers. R2 is independently selected from a residue of a primary diamine or a secondary diamine. R3 is independently selected from an alkylene group or an arylene group. R4 is independently selected from H, an alkyl group, an alkenyl group, an aryl group, a cycloalkyl group, or two R4 groups are alkylene or branched alkylene and form a heterocyclic compound.

In a nineteenth embodiment, the present disclosure provides an ionomer polyamide according to the eighteenth embodiment, wherein at least one R2 is a residue of an oxyalkylene diamine and at least one R3 is an arylene group.

In a twentieth embodiment, the present disclosure provides an ionomer polyamide according to any of the first through nineteenth embodiments, wherein the at least one second diacid is present and a mole fraction of the at least one diacid is 0.01 to 0.50, based on the total moles of a combination of the dimer acid, the at least one second diacid, and any ionomer diacid or diester used to form the ionomer polyamide.

In a twenty-first embodiment, the present disclosure provides an ionomer polyamide according to any of the first through twentieth embodiments, wherein a molar ratio of the oxyalkylene diamine to the ionomer component is 0.10 moles oxyalkylene to 1.0 mole ionomer component to 2.0:1.0, 0.15:1.0 to 1.0:1.0, or 0.20:1.0 to 0.50:1.0 moles oxyalkylene diamine to moles ionomer component.

In a twenty-second embodiment, the present disclosure provides an ionomer polyamide according to any of the first through twenty-first embodiments, wherein the ionomer component comprises an ionomer diacid.

In a twenty-third embodiment, the present disclosure provides an ionomer polyamide according to any of the first through twenty-second embodiments, wherein the ionomer component comprises an ionomer diester.

In a twenty-fourth embodiment, the present disclosure provides an ionomer polyamide according to any of the first through twenty-third embodiments, wherein the ionomer component comprises an ionomer diamine.

In a twenty-fifth embodiment, the present disclosure provides a primer. The primer comprises up to 20 percent by weight of the ionomer polyamide according to any of the first through nineteenth embodiments.

In a twenty-sixth embodiment, the present disclosure provides a primer according to the twenty-fifth embodiment, wherein the ionomer polyamide is dispersed in a solvent comprising 80-90 percent by weight water, 10-20 percent by weight of a C2-C4 aliphatic alcohol, and optionally a pH adjuster.

In a twenty-seventh embodiment, the present disclosure provides a primer according to the twenty-fifth embodiment, wherein the ionomer polyamide is dispersed in water.

In a twenty-eighth embodiment, the present disclosure provides a primer according to any of the twenty-fifth through twenty-seventh embodiments, wherein the ionomer polyamide is acid- or amine-terminated and the primer has a pH of 2-6 or 8-11.

In a twenty-ninth embodiment, the present disclosure provides a primer according to any of the twenty-fifth through twenty-eighth embodiments, wherein the primer is essentially free of a surfactant.

In a thirtieth embodiment, the present disclosure provides an article. The article comprising a substrate and a layer of the ionomer polyamide according to any of the first through nineteenth embodiments disposed on a major surface of the substrate.

In a thirty-first embodiment, the present disclosure provides an article according to the thirtieth embodiment, further comprising an adhesive disposed on a major surface of the layer of the ionomer polyamide.

In a thirty-second embodiment, the present disclosure provides an article according to the thirtieth embodiment or the thirty-first embodiment, wherein the adhesive comprises a polymer comprising at least one pendant carboxylic acid group.

In a thirty-third embodiment, the present disclosure provides an article according to any of the thirtieth through thirty-second embodiments, wherein the layer of the ionomer polyamide has an average thickness of less than 1 micrometer, less than 0.5 micrometers, or less than 0.25 micrometers.

In a thirty-fourth embodiment, the present disclosure provides an article according to any of the thirtieth through thirty-third embodiments, wherein the ionomer polyamide exhibits a shear modulus of 0.01 to 3 megapascals (MPa) at 25 degrees Celsius.

In a thirty-fifth embodiment, the present disclosure provides an article. The article comprises a substrate and a layer of the primer according to any of the twentieth through twenty-third embodiments disposed on a major surface of the substrate.

In a thirty-sixth embodiment, the present disclosure provides an article according to the thirty-fifth embodiment, wherein the primer layer exhibits a shear modulus of greater than 5 MPa at 25 degrees Celsius.

In a thirty-seventh embodiment, the present disclosure provides an article according to any of the thirtieth through thirty-sixth embodiments, wherein the substrate comprises a polar polymeric material.

In a thirty-eighth embodiment, the present disclosure provides a method of making an ionomer polyamide. The method comprises reacting components of a polymerizable composition comprising: a first diacid that is a dimer acid; an ionomer component that is an ionomer diacid, an ionomer diester, and/or an ionomer diamine; a first diamine that is an oxyalkylene diamine; at least one second diamine comprising a primary diamine and/or a secondary diamine; and optionally at least one second diacid. A mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid, and any ionomer diacid or diester used to form the ionomer polyamide. A mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer In a thirty-ninth embodiment, the present disclosure provides a method according to the thirty-eighth embodiment, wherein the ionomer polyamide is according to any of the first through twenty-fourth embodiments.

In a fortieth embodiment, the present disclosure provides a method according to the thirty-eighth embodiment or the thirty-ninth embodiment, wherein the reacting comprises refluxing the polymerizable composition followed by distillation.

In a forty-first embodiment, the present disclosure provides a method according to any of the thirty-eighth through fortieth embodiments, further comprising adjusting the pH of a composition containing the ionomer polyamide by adding one or more pH adjusters.

In a forty-second embodiment, the present disclosure provides a method of making an article. The method comprises: coating the primer according to any of the twenty-fifth through twenty-ninth embodiments on a major surface of a substrate; and orienting the substrate.

In a forty-third embodiment, the present disclosure provides a method according to the forty-second embodiment, wherein the orienting comprises biaxial orientation.

In a forty-fourth embodiment, the present disclosure provides a method according to the forty-second embodiment or the forty-third embodiment, further comprising at least one of heating or drying the primer, thereby obtaining a layer of the ionomer polyamide having an average thickness of less than 1 micrometer, less than 0.5 micrometers, or less than 0.25 micrometers.

In a forty-fifth embodiment, the present disclosure provides a method according to the forty-fourth embodiment, further comprising applying a layer of an adhesive on a major surface of the layer of the ionomer polyamide.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Unless otherwise noted or apparent from the context, all parts, percentages, ratios, etc. in the Examples and the rest of the specification are by weight. The Materials Table (below) lists materials used in the examples and their sources.

Materials Table

| Abbreviation | DESCRIPTION |
|---|---|
| Pripol 1013 | Dimer Fatty Acid, obtained from Croda, Inc., Edison, NJ, under trade designation "PRIPOL 1013" |
| Pripol 1017 | Dimer Fatty Acid, obtained from Croda, Inc., Edison, NJ, under trade designation "PRIPOL 1017" |
| SA | Sebacic acid, obtained from Alfa-Aesar, Haverhill, MA |
| DMSSIP | Dimethyl 5-sulfoisophthalate, sodium salt, obtained from Alfa-Aesar, Haverhill, MA |
| PIP | Piperazine, obtained from Alfa-Aesar, Haverhill, MA |
| EDA | Ethylene diamine, obtained from Alfa-Aesar, Haverhill, MA |
| AEP | 2-Aminoethyl piperazine, obtained from Alfa-Aesar, Haverhill, MA |
| ED2003 | A water-soluble, low vapor pressure aliphatic diamine, obtained from Huntsman Corp., The Woodlands, TX, under trade designation "JEFFAMINE ED-2003" |
| H3PO4 | 85 wt. % phosphoric acid in water, obtained from Alfa-Aesar, Haverhill, MA |
| AFE-1520 | A 20% active, food-grade, silicone emulsion, obtained from Dow Chemical, Midland, MI, under trade designation "XIAMETER AFE-1520 ANTIFOAM EMULSION" |
| PS30 | A liquid amine antioxidant stabilizer, obtained from Addivant, Danbury, CT under trade designation "NAUGARD PS30" |
| IPA | Isopropanol from JT Baker (Avantor Sciences), Radnor, PA |
| DIW | Deionized water |
| PET | Unoriented poly(ethylene terephthalate) film, was prepared by using conventional film making processes using a twin screw extruder with vacuum capabilities, eliminating the need to pre-dry resin. A purified terephthalic acid (available from Eastman Chemical Company, Kingsport, TN) melt was processed through a drop die and tacked to a chill roll for quenching of the cast web with electrostatic pinning. The cast web thickness was targeted at 3-5 times the desired stretched or oriented thickness. |

-continued

Materials Table

| Abbreviation | DESCRIPTION |
|---|---|
| IOA | Isooctyl acrylate (Sigma-Aldrich Co., LLC, St. Louis, MO) |
| AA | Acrylic acid (Sigma-Aldrich Co., LLC) |
| Photoinitiator | 2,2-Dimethoxy-2-phenylacetophenone, available under the trade designation "OMNIRAD BDK" from IGM Resins USA Inc., Charlotte, NC. |
| 2EHA | 2-Ethylhexyl acrylate, obtained from BASF, Ludwigshafen, Germany |
| 2,4-triazine | 2,4-bis(trichloromethyl)-6-(3,4 dimethoxyphenyl)-s-triazine (made by the co-trimerization of an arylnitrile with trichloroacetonitrile in the presence of HCl gas and a Lewis acid such as $AlCl_3$, $AlBr_3$, etc. [Bull. Chem. Soc. Japan, Vol. 42, page 2924 (1969)] |

General Procedure for Polyamide Synthesis

To a 1-liter glass resin flask equipped with a mechanical stirrer, thermocouple, distillation head fitted with a 100-milliliter receiver flask and a nitrogen gas inlet/outlet port were added all of the raw materials listed in Table 1 except the PS30. The contents of the flask were heated to 160° C. using an electric mantle and controller with stirring under a nitrogen atmosphere. The reaction mixture was allowed to reflux for 60 minutes before the cold finger on the distillation head condenser was switched over to distillation. Once the rate of water evolution slowed down, the batch temperature was raised to 225° C. and held overnight with stirring under a nitrogen atmosphere. A 20-30 millimeter of mercury vacuum was introduced in the flask over a period of 5-10 minutes. The vacuum was held for 2 hours after which time nitrogen gas was introduced into the flask. The PS30 was added and allowed to stir for 15 minutes after which the reactor was disassembled, and the contents poured into a silicone release paper lined aluminum tray. The contents were allowed to cool to room temperature spontaneously and collected.

General Procedure for Preparation of Polyamide Dispersions E1-E7

The dimer acid-based ionomer polyamides from Table 1, isopropanol, aqueous sodium hydroxide and deionized water were added to a flask equipped with an overhead stirrer, thermocouple and a distillation head fitted with a 500-milliliter receiver flask according to Table 3. The mixture was heated to 84° C. with stirring under nitrogen for 2 hours when a clear solution was formed. The isopropanol was then distilled off under atmospheric pressure conditions resulting in a milky white dispersion. The contents of the flask were cooled to ambient spontaneously and collected as E1-E7 (Table 3). The solids content for E1-E7 was determined for each dispersion according to the General Procedure for Determination of % Solids.

General Procedure for Determination of % Solids

Approximately 1 gram of polyamide dispersion was added to a tared aluminum pan. The exact weight of dispersion was recorded. The aluminum pan was placed in a forced air oven with a temperature setting of 105° C. for 2 hours. After this period, the pan was removed from the oven and allowed to cool for at least 2 minutes. The weight of the pan and contents was recorded. The % solids were calculated according to the formula:

$$\%\text{Solids} = \frac{\text{Dried Pan (grams)} - \text{Empty Pan (grams)}}{\text{Pan with dispersion (grams)} - \text{Empty Pan (grams)}} \times 100$$

General Procedure for Preparation of Ionomer Polyamide Primer Coatings

Biaxially oriented PET film with an ionomer polyamide coating were prepared using Mayer rod coatings on cast (unoriented) PET film followed by batch oven drying the coated film in a forced air oven at a temperature above 70-80° C. and below the natural $T_g$ of the PET film. Once dried, the coated PET cast film was then cut into 150 millimeters×250 millimeters sheets that are then loaded into a lab scale batch tenter oven (Karo IV lab stretcher, Bruckner Maschinenbau GmbH & Co. KG, Germany) referred to hereinafter as the "Karo". The Karo had 2 ovens, one was to preheat the oven used to heat the film with or without coating layer as described above to a temperature determined by the film substrate sufficient to stretch the film either uniaxially or biaxially to simulate production tentering or orientation of the polymer film as described above. Once initial stretching was completed, the oriented film and coating were then moved into a second oven that simulates heat set or annealing of the polymer film and coating at much higher temperatures typically found in processing of oriented films as described above.

The temperatures of the first preheat zone of the Karo film orienter are near the $T_g$ of the film being oriented, in the case of PET films, was between 90° C. and 105° C., and the time of the preheating of the film was dependent on the amount of time needed for the film and coating to reach sufficient temperatures to adequately stretch the films uniaxialy and or biaxially as desired. Typical times for preheat oven was between 20 seconds and 60 seconds for cast PET films between 250 micrometers and 1270 micrometers (10 and 50 mils) thick. Once the polymer film and/or coating was at sufficient temperatures, the films were stretched in one or both directions, known as MD, Machine Direction and TD, Transverse Direction at typical stretch dimensions, also known as draw ratios common for PET films. Common stretch ratios were between 1:1 and 2:1 the original size in the MD, and 1:1 and 5:1 in the TD direction, more typically, 1.1 to 1:1.5 in the MD direction and 3:1 to 4:1 in the TD direction.

Once the polymer film was oriented in Stretch zone of the Karo, the film was then transported to the Annealing "Heat set" oven or zone of the Karo film orienter. The temperatures in the Annealing zones of the Karo were typical of normal film production, between 200° C. and 260° C., more commonly 215 to 255° C. to simulate common annealing, heat setting of the oriented PET film and/or coating as is typical of production film orientation as described above.

The thicknesses of the wet, dry and stretched dry (e.g., after stretching on Karo) primer coatings were measured and reported. The stretched dry primer coating thickness was calculated by dividing the dry coating thickness before stretch by the total karo stretch.

Preparation of Pressure Sensitive Adhesive Transfer Tape

An approximately 56 micrometer thickness, crosslinked and removable pressure sensitive adhesive layer was prepared from a blend of 83/15/2 w/w parts IOA/2EHA/AA. The adhesive layer was prepared via in situ UV polymerization to cure and crosslink (photoinitiator, 2,4-triazine crosslinker and 351 nm maxima UV source) onto a removable silicone coated release liner to provide the Pressure Sensitive Adhesive Transfer Tape.

Preparation of Adhesive Coated, Oriented Primed Films

Primer coated, oriented films, measuring approximately 12.7 centimeters by 25.4 centimeters (5 inches by 10 inches), were placed on a flat surface with the primer coated side facing up (exposed). The PSA adhesive transfer tape was laminated to the exposed primer surface, with its' adhesive surface in contact with the primer surface, by hand using a 15-centimeters (six inch) wide rubber roller and rolling back and forth two times. A construction having, in order, an oriented film, a primer coating, and adhesive layer, and an embossed liner was obtained.

General Procedure for Preparation of Adhesive Samples

Primer coated, oriented films, measuring approximately 12.7 centimeters by 25.4 centimeters (5 inches by 10 inches), were placed on a flat surface with the primer coated side facing up (exposed). The Adhesive Transfer Tape, prepared according to the Preparation of Pressure Sensitive Adhesive Transfer Tape, was laminated to the exposed primer surface, with its' adhesive surface in contact with the primer surface by hand using a 15-centimeters (6-inches) rubber roller and rolling back and forth two times. A construction having, in order, an oriented film, a primer coating, and adhesive layer, and an embossed liner was obtained.

General Procedure for Primer-PSA Bond Test Method

The adhesive samples were prepared according to the General Procedure for Preparation of Adhesive Samples. The adhesive samples were bonded to a flat anodized aluminum plate using a 4.5 pounds (2.0 kilograms) roller, 2 passes at 0.51 centimeters per second (12 inches per minute). After lamination to the plate, the adhesive sample was removed at 0.51 centimeters per second (12 inches per minute) at an angle of 90 degrees using a Model 2000/2100 TL-2300 IMASS Peel Tester (IMASS Inc., Accord, MA). The average load across 7.5 centimeters (3 inches) of sample length was tested was recorded for each sample. The adhesion testing was performed in a controlled environment at 73° F. (22.8° C.) and 50% relative humidity (RH).

Preparation of Ionomer Polyamides P1-P7

Ionomer polyamides P1-P7 were prepared according to the General Procedure for Polyamide Synthesis. The monomers and additive quantities are specified in Table 1 and the molar fraction compositions are specified in Table 2. Typical yield was 600-700 grams.

TABLE 1

| | | Acid Monomers (grams) | | | | | | | | | | |
|---|---|---|---|---|---|---|---|---|---|---|---|---|
| | Amine/Acid | Pripol | Pripol | | | Amine Monomers (grams) | | | | AFE-1520 | H3PO4 | PS30 |
| Ex. | Mole Ratio | 1013 | 1017 | SA | DMSSIP | PIP | EDA | AEP | ED2003 | (grams) | (grams) | (grams) |
| P1 | 1.049 | 503.6 | 0.0 | 63.2 | 18.5 | 22.6 | 45.5 | 33.8 | 64.8 | 0.03 | 0.17 | 7.0 |
| P2 | 1.049 | 478.4 | 25.6 | 63.2 | 18.5 | 22.6 | 45.5 | 33.8 | 64.8 | 0.03 | 0.17 | 7.0 |
| P3 | 1.049 | 453.2 | 51.1 | 63.2 | 18.5 | 22.6 | 45.5 | 33.8 | 64.8 | 0.03 | 0.17 | 7.0 |
| P4 | 0.97 | 436.9 | 111.5 | 52.6 | 27 | 85.3 | 15.2 | 0.0 | 38.5 | 0.03 | 0.17 | 7.0 |

TABLE 1-continued

| | | Acid Monomers (grams) | | | | Amine Monomers (grams) | | | | | | |
|---|---|---|---|---|---|---|---|---|---|---|---|---|
| | Amine/Acid | Pripol | Pripol | | | | | | | AFE-1520 | H3PO4 | PS30 |
| Ex. | Mole Ratio | 1013 | 1017 | SA | DMSSIP | PIP | EDA | AEP | ED2003 | (grams) | (grams) | (grams) |
| P5 | 0.969 | 497.2 | 126.9 | 0.0 | 35.5 | 60.2 | 26.9 | 0.0 | 35.5 | 0.03 | 0.17 | 7.0 |
| P6 | 0.969 | 486.2 | 124.1 | 0.0 | 42.7 | 60.2 | 26.9 | 0.0 | 35.5 | 0.03 | 0.17 | 7.0 |
| P7 | 0.969 | 326.3 | 83.3 | 68.3 | 23.3 | 56.4 | 19.7 | 0.0 | 222.2 | 0.03 | 0.17 | 7.0 |

TABLE 2

| | | Acid Monomers (mole fraction) | | | | Amine Monomers (mole fraction) | | | |
|---|---|---|---|---|---|---|---|---|---|
| | Amine/Acid | Pripol | Pripol | | | | | | |
| Example | Mole Ratio | 1013 | 1017 | SA | DMSSIP | PIP | EDA | AEP | ED2003 |
| P1 | 1.049 | 0.70 | 0.00 | 0.25 | 0.05 | 0.20 | 0.575 | 0.20 | 0.025 |
| P2 | 1.049 | 0.665 | 0.035 | 0.25 | 0.05 | 0.20 | 0.575 | 0.20 | 0.025 |
| P3 | 1.049 | 0.63 | 0.07 | 0.25 | 0.05 | 0.20 | 0.575 | 0.20 | 0.025 |
| P4 | 0.97 | 0.584 | 0.146 | 0.20 | 0.07 | 0.785 | 0.20 | 0.0 | 0.015 |
| P5 | 0.969 | 0.72 | 0.18 | 0.0 | 0.10 | 0.60 | 0.385 | 0.0 | 0.015 |
| P6 | 0.969 | 0.704 | .176 | 0.0 | 0.12 | 0.60 | 0.385 | 0.0 | 0.015 |
| P7 | 0.969 | 0.504 | 0.126 | 0.30 | 0.07 | 0.60 | 0.30 | 0.0 | 0.10 |

Preparation of Ionomer Polyamide Dispersions E1-E7

Ionomer Polyamide Dispersions E1-E7 were prepared according to the General Procedure for Preparation of Polyamide Dispersions E1-E7. The quantities of materials are specified in Table 3.

TABLE 3

| Example | Polyamide ID | Polyamide (grams) | DIW (grams) | IPA (grams) | 1.0M NaOH (grams) | % Solids |
|---|---|---|---|---|---|---|
| E1 | P1 | 132 | 950.4 | 237.6 | 0 | 15.8 |
| E2 | P2 | 132 | 950.4 | 237.6 | 0 | 15.5 |
| E3 | P3 | 132 | 950.4 | 237.6 | 0 | 15.6 |
| E4 | P4 | 80 | 342.7 | 80 | 20 | 19.9 |
| E5 | P5 | 80 | 342.7 | 80 | 20 | 19.6 |
| E6 | P6 | 50 | 342.7 | 80 | 20 | 19.3 |
| E7 | P7 | 40 | 358 | 40 | 10 | 11.1 |

Preparation of Ionomer Polyamide Coatings E8-E10

Examples E1-E3 were coated on cast (unoriented) polyethylene terephthalate (PET) film and then the substrate PET was biaxially oriented to obtain coatings E8-E10, respectively. The water-based polyamide dispersions from Table 3 were coated on PET (polyethylene terephthalate) cast film with a Mayer rod to a wet coating thickness of 5 micrometers. The coating and cast film were then dried in a forced air oven for 3 minutes at 80° C. and the dried coating and film removed to cool to room temperature.

Film and coating cast web pieces were trimmed to 150 millimeters×250 millimeters for loading into the Karo film orienter. The Karo film orienter was preheated as follows, 100° C. in the preheat oven zone and 225° C. in the Annealing oven zone. The coated and trimmed film samples were loaded into the Karo orientation frame load position and clipped into place to hold them secure during heating and stretching. The Karo film samples were then preheated at 100° C. for 50 seconds and then stretched 1.5 by 3.8 times in the stretch oven zone. Once stretched, the film and coating were moved into the annealing zone (225° C.) and heat set for 15 seconds. The completed film and coating sample was then returned to the loading position of the Karo film stretcher and removed from the clips after they released the oriented film sample. The settings for the Karo film orienter are specified in Table 4.

TABLE 4

| | |
|---|---|
| Preheat/stretch oven | 95 to 105° C. |
| Annealing/heat set oven | 215 to 225° C. |
| Initial cast film plus coating size before stretch | 150 mm (TD) × 250 mm (MD) |
| TD stretch of the original cast film and coating size | 3.8:1 |
| MD stretch of the original cast film and coating size | 1.5:1 |
| Final film size with coating after orientation | 570 mm (TD) × 375 mm (MD) |

This procedure was repeated until all samples were coated, stretched and heat set. These samples were then trimmed to remove the excess film left over from the stretching process and made ready for adhesive coating. Final film size with coating after orientation is the initial film size multiplied by the stretch ratio. The target coating thickness after film stretching is calculated as follows:

Dry Coating Thickness=(Ionomer Polyamide Dispersion % Solids)×(Wet Coating Thickness)

The stretch ratio for E8-E10 was calculated according to:

$$\text{Stretch ratio} = \frac{570\ \text{mm} \times 375\ \text{mm}}{150\ \text{mm} \times 250\ \text{mm}} = 5.7$$

Final coating thickness after Karo stretching of the film=(dry coating thickness)/(stretch ratio).

TABLE 5

| Example | Dispersion ID | Dispersion % Solids | Wet Coating Thickness (μm) | Dry Coating Thickness (μm) | Stretched Dry Coating Thickness (μm) |
|---|---|---|---|---|---|
| E8 | E1 | 15.8 | 5 | 0.79 | 0.14 |
| E9 | E2 | 15.5 | 5 | 0.78 | 0.14 |
| E10 | E3 | 15.6 | 5 | 0.78 | 0.14 |

Adhesion Performance Testing of Ionomer Polyamide Coatings

Films E8-E10 were hand laminated to the Adhesive Transfer Tape according to the General Procedure for Preparation of Adhesion Samples. The constructions were aged for 7 days in the conditions listed in Table 6. The adhesive samples were tested for PSA to primer bond by peel testing according to the General Procedure for Primer-PSA Bond Test Method. The results are summarized in Table 6.

TABLE 6

| Ionomer Polyamide Coating | Rep | 2-Bond Results (N/cm) 23° C., 50% RH | 120 F. | 32° C., 65% RH | 32° C., 90% RH |
|---|---|---|---|---|---|
| E8 | 1 | 6.3 | 10.1 | 9.4 | 9.4 |
| E8 | 2 | 6.8 | 9.4 | 10.9 | 9.6 |
| E8 | 3 | 6.8 | 9.2 | 10.5 | 10.3 |
| E9 | 1 | 6.3 | 10.1 | 10.7 | 7.9 |
| E9 | 2 | 6.3 | 10.1 | 11.2 | 8.1 |
| E9 | 3 | 6.1 | 10.5 | 10.7 | 8.1 |
| E10 | 1 | 6.6 | 9.9 | 11.4 | 9.2 |
| E10 | 2 | 6.8 | 9.2 | 10.5 | 9.4 |
| E10 | 3 | 7.2 | 10.3 | 10.7 | 8.8 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An ionomer polyamide comprising a reaction product of a polymerizable composition comprising:

a) a first diacid that is a dimer acid;

b) an ionomer component that is an ionomer diacid, an ionomer diester, and/or an ionomer diamine;

c) a first diamine that is an oxyalkylene diamine;

d) at least one second diamine comprising a primary diamine and/or a secondary diamine; and e) optionally at least one second diacid, wherein a mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid, and any ionomer diacid or diester used to form the ionomer polyamide; and wherein a mole fraction of the oxyalkylene diamine is 0.005 to 0.10 and a mole fraction of the at least one second diamine is 0.90 to 0.995, each based on the total moles of a combination of the oxyalkylene diamine, the at least one second diamine, and any ionomer diamine used to form the ionomer polyamide.

2. The ionomer polyamide of claim 1, wherein the oxyalkylene diamine comprises each of an ethylene oxide and a propylene oxide.

3. The ionomer polyamide of claim 2, wherein the ionomer polyamide is acid- or amine-terminated.

4. The ionomer polyamide of claim 1, wherein the at least one second diamine comprises an aliphatic diamine and a cycloaliphatic diamine.

5. The ionomer polyamide of claim 1, wherein the at least one second diamine is of the Formula (III):

R5-NH-R6-NH—R5 (III);

wherein R5 is independently selected from a linear or branched alkyl, a cycloalkyl, an aryl, a heteroalkyl, a heteroaryl, a hydrogen atom with the proviso that both R5s are not hydrogen atoms, or the R5 groups are alkylene or branched alkylene and form a heterocyclic compound; and wherein R6 is an alkylene, a branched alkylene, a cycloalkylene, a substituted or unsubstituted arylene, or a heteroalkylene.

6. The ionomer polyamide of claim 1, wherein the dimer acid has a number average molecular weight of between 300 g/mol and 1400 g/mol.

7. The ionomer polyamide of claim 1, wherein the polymerizable composition lacks a diol.

8. The ionomer polyamide of claim 1, wherein the ionomer polyamide is of the structure of Formula (I) or Formula (II):

(I)

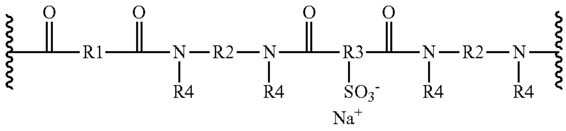

;

(II)

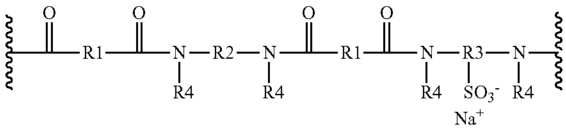

;

wherein R1 is independently selected from a residue of the dimer acid, a residue of the ionomer diacid or diester, or a residue of any other diacid monomers;

wherein R2 is independently selected from a residue of a primary diamine or a secondary diamine;

wherein R3 is independently selected from an alkylene group or an arylene group; and wherein R4 is independently selected from H, an alkyl group, an alkenyl group, an aryl group, a cycloalkyl group, or two R4 groups are alkylene or branched alkylene and form a heterocyclic compound.

9. A primer comprising up to 20 percent by weight of the ionomer polyamide of claim 1.

10. The primer of claim 9, wherein the ionomer polyamide is dispersed in a solvent comprising 80-90 percent by weight water, 10-20 percent by weight of a C2-C4 aliphatic alcohol, and optionally a pH adjuster.

11. The primer of claim 9, wherein the ionomer polyamide is dispersed in water.

12. The primer of claim 9, wherein the ionomer polyamide is acid- or amine-terminated and the primer has a pH of 2-6 or 8-11.

13. An article comprising a substrate and a layer of the ionomer polyamide of claim 1 disposed on a major surface of the substrate.

14. The article of claim 13, further comprising an adhesive disposed on a major surface of the layer of the ionomer polyamide comprising a polymer comprising at least one pendant carboxylic acid group.

15. The article of claim 13, wherein the layer of the ionomer polyamide has an average thickness of less than 1 micrometer, less than 0.5 micrometers, or less than 0.25 micrometers.

16. An article comprising a substrate and a layer of the primer of claim 9 disposed on a major surface of the substrate.

17. The article of claim 13, wherein the substrate comprises a polar polymeric material.

18. A method of making an ionomer polyamide, the method comprising reacting components of a polymerizable composition comprising:

a) a first diacid that is a dimer acid;

b) an ionomer component that is an ionomer diacid, an ionomer diester, and/or an ionomer diamine;

c) a first diamine that is an oxyalkylene diamine;

d) at least one second diamine comprising a primary diamine and/or a secondary diamine; and e) optionally at least one second diacid, wherein a mole fraction of the dimer acid is 0.40 to 0.99, a mole fraction of the ionomer component is 0.01 to 0.20, and a mole fraction of the at least one second diacid is 0 to 0.60, each based on the total moles of a combination of the dimer acid, the at least one second diacid used to form the ionomer polyamide, and any ionomer diacid or diester, and wherein a mole fraction of the oxyalkylene diamine is 0.005 to 0.10 and a mole fraction of the at least one second diamine is 0.70 to 0.995, each based on the total moles of a combination of the oxyalkylene diamine, the at least one second diamine, and any ionomer diamine used to form the ionomer polyamide.

19. A method of making an article comprising:

coating the primer of claim 9 on a major surface of a substrate; and orienting the substrate.

20. The method of claim 19, further comprising at least one of heating or drying the primer, thereby obtaining a layer of the ionomer polyamide having an average thickness of less than 1 micrometer, less than 0.5 micrometers, or less than 0.25 micrometers.

* * * * *